United States Patent [19]
Funderburk et al.

[11] 4,274,155
[45] Jun. 16, 1981

[54] MULTIPORT CONFERENCE CIRCUIT WITH MULTI-FRAME SUMMING AND VOICE LEVEL CODING

[75] Inventors: Tim Funderburk, Villa Park; Donald W. McLaughlin, Naperville, both of Ill.

[73] Assignee: GTE Automatic Electric Laboratories Inc., Northlake, Ill.

[21] Appl. No.: 64,201

[22] Filed: Aug. 6, 1979

[51] Int. Cl.³ .......................... H04J 3/02; H04M 3/56
[52] U.S. Cl. ...................................................... 370/62
[58] Field of Search ....................... 179/18 BC, 1 CN; 370/62

[56] References Cited
U.S. PATENT DOCUMENTS

| | | | |
|---|---|---|---|
| 3,947,639 | 3/1976 | Nicholas et al. | 179/1 CN |
| 4,054,755 | 10/1977 | Lee et al. | 179/18 BC X |
| 4,059,735 | 11/1977 | Betts | 179/18 BC |
| 4,175,215 | 11/1979 | McLaughlin et al. | 179/18 BC |

Primary Examiner—Thomas W. Brown
Attorney, Agent, or Firm—Robert J. Black; Charles A. Doktycz

[57] ABSTRACT

An improved conference circuit for use in a Pulse Code Modulation telephone switching system wherein a number of channels are combined so that a number of subscribers may participate in a common telephone conversation. The conference circuit is provided with a voice level coding arrangement whereby the voice level comparisons used in the speaker selection process are facilitated, and with a multi-frame coded voice level summing arrangement whereby channel switching caused by spurious noise peaks is effectively eliminated.

8 Claims, 10 Drawing Figures

MULTIPORT CONFERENCE CIRCUIT WITH MULTI-FRAME SUMMING AND VOICE LEVEL CODING

CROSS REFERENCES TO RELATED APPLICATIONS

Ser. No. 064,202, and Ser. No. 064,203 filed concurrently herewith each in the names of T. Funderburk and D. W. McLaughlin entitled respectively "Multiport Conference Circuit with Voice Level Coding" and "Multiport Conference Circuit with Multiframe Summing" and assigned to the same assignee as the present application.

BACKGROUND OF THE INVENTION

1. Field of the Invention

This invention relates generally to transmission and switching techniques in telephone communication systems and, more particularly, to an improved conference technique whereby a number of channels in a telephone switching system employing pulse code modulation for transmission purposes are combined so that a number of subscribers may participate in a common telephone conversation. More particularly still, it relates to improvements in a multi-port conference circuit of the type disclosed in U.S. Patent Application Ser. No. 857,168 filed Dec. 5, 1977, now U.S. Pat. No. 4,175,215 issued Nov. 20, 1979, which is assigned to the same assignee as the present invention.

The present invention pertains to a multiport conference circuit for use in a private automatic branch exchange similar to those units manufactured by GTE Automatic Electric Incorporated and designated GTD120. Circuitry with minimum modification could also be employed in class five central offices that employ digital switching. Such telephone systems employ a time switching network rather than a space divided switching network.

In time division switching networks a requirement exists to have sources of pulse code modulated voice samples associated with time slots. These time slots allow the conference to sequentially receive the code for each conferee. For the conference circuit to be effective, it must be able to recognize who the conferees are and, of course, who is not associated with the conference. The circuitry must also be capable of distributing the conference speakers' code to each conferee. Information of this sort is, of course, available in the telephone switching systems referred to above. It should be understood that only telephone switching systems employing pulse code modulation can use the circuitry of the present invention, and such circuitry interfaces with time division portions of such switching networks.

2. Description of the Prior Art

An approach to the handling of pulse code modulated information and conference circuitry is taught by U.S. Pat. Nos. 3,699,264, 4,007,338 and 4,054,755, which are assigned to the same assignee as the present invention. In these noted patents, digital signals are not converted to analog; but rather the binary words from the participating channels are compared with the channel having the smallest binary numbers selected as the speaker. An improvement in the conference circuitry disclosed in these above-identified U.S. patents is disclosed in the above-referenced U.S. Patent Application Ser. No. 857,168, now U.S. Pat. No. 4,175,215.

PCM conferencing as taught in the above-identified patents and application requires a source of pulse code modulated (PCM) coded voice samples which have associated time slots. These time slots allow the conference to sequentially receive a code for each conferee. The conference circuitry must be able to recognize who the conferees are and who is not associated with the conference call.

In the above-referenced U.S. Patent Application Ser. No. 857,168, now U.S. Pat. No. 4,175,215, PCM samples are taken for each conferee from the time switch and via comparator circuits, a PCM sample is sent to the conferee. Since the selected PCM sample is not determined until all samples are compared, a frame delay is required after which all conferees except the selected conferee will receive the selected PCM sample from the previous frame. The selected conferee, in turn, receives a null code (perfect idle channel). To minimize speech clipping or selecting noise, two circuits, a preliminary and a preferred speaker preference circuit, are employed.

The preliminary preference circuit utilizes the identity of the previous selected speaker and after its PCM sample is compared, its binary weight is modified to the highest value of a corresponding curve segment. This is done by adding a bit between the segment and the step bits, allowing the binary value to be decreased. This technique permits the conference circuit to hold onto the previous speaker if the incoming PCM samples are in the same PCM segment or below in value.

The preferred speaker preference circuit functions when the magnitude of the present PCM sample exceeds the value of the preferred preference circuit threshold. When a speaker is selected for the succeeding frame and has a larger PAM (smaller PCM code) sample than the threshold, a preferred preference circuit creates a lower binary weight (apparently larger PAM) to the comparator, for the selected speaker, for a period of one frame. This reduces speech clipping during that time when two or more conferees are conversing simultaneously.

Neither the preliminary nor the preferred preference circuit alters the incoming or the outgoing PCM sample to the comparison circuit to favor the previous speaker.

Further improvements in the multi-port conference circuit taught in the above-referenced U.S. Patent Application Ser. No. 857,168, now U.S. Pat. No. 4,175,215 are directed to reduce or substantially eliminate the problem of high idle channel noise resulting from always choosing the largest signal above null code (quiet or absence of signal), the distortion of signals to the listeners and distortion of the speaker side tone, and finally difficulties from foreign signals.

A major contribution to the speech quality degradation in digital conferencing is due to signal reflections of the original signal circulating and fighting for control of the conference. To provide transmission of only the primary signal, a continuous threshold is established to pass the primary and exclude the reflection. It is only used in the selection process. For conditions which do not provide the threshold being met, the previous speaker is retained.

Multiple speaker operation still provides flip-flop operation and is very rapid as compared to echo suppressor type flip-flopping or speaker phone operation. Thus, the loss of syllables is not heard; however, one may notice the shift of background noise levels, especially if one has a background signal like a radio.

This constant switch is reduced, by a locking method where though the foreign signal is still present, it is not chopped up due to the switching between idle channels.

The conference circuitry includes two threshold comparators, one for the new conferee and one for the temporary speaker.

The new conferee's PCM is measured against the threshold, as well as that which reaches a temporary speaker PCM buffer which is also sensed to see if it is the previous speaker. Only conferees with PCM codes greater than that of the temporary speaker are allowed to take over. A greater code is actually of less binary value so A<B allows the update to exist. The A corresponds to the conferee PCM buffer when the B corresponds to the temporary speaker PCM buffer. If the conferee is the previous speaker, it is updated unless the temporary speaker signal is greater and also exceeds the threshold. Once in the temporary speaker PCM buffer, only conferees which meet the threshold and exceed the temporary speaker PCM buffer will be allowed to take over. If neither of the conditions occur (i.e., the previous speaker is not encountered for this decision), just the PCM code values are used with the last being allowed to take over the temporary buffer.

SUMMARY OF THE INVENTION

Accordingly, it is an object of this invention to further improve the above described type of operation by eliminating the possibility of switching to an idle conferees channel because of the presence of spurious noise pulses.

Another object of this invention is to simplify the above described type of operation by eliminating the multiple comparison steps for each conferee.

This is accomplished within a similiar PCM environment where time slot 94 of the Network is dedicated for conferencing. The conference circuit monitors the networks control memory contents, and when Time Slot I.D. 94 is detected in the control "A" memory 202, the conference circuit receives the PCM samples into the PCM buffers for processing. The control "B" memory 203 contains the conferee's own time slot I.D. This improvement is accomplished by having each conferee's PCM decoded and assigned a peg value of 0, 1, 2, 4, or 9 depending on the strength relative to a predetermined threshold level. The conferee with the greatest number of pegs, representing the greatest total energy, at the end of a selected number of frames shall have control during the next set of frames. If no conferee's peg count exceeds the last speaker, or if the last speaker is tied, the last speaker shall retain control.

Conference control is based on a threshold level of PCM code along with the requirement to have code values representing the largest PAM value. This corresponds to the least binary code value due to the nature of PCM coding. The peg value is determined from the three most significant bits of the conferee's PCM, excluding the sign bit.

To allow synchronous operation with the network time switching of the PCM code operation, timing signals are generated which are derived from the network clock. The conference circuit does not alter the normal operations of the network time switching functions when either connected to or disconnected from the EPABX such as the GTD120.

BRIEF DESCRIPTION OF THE DRAWINGS

FIG. 9 illustrates the manner in which FIGS. 3 through 8 are to be placed together to form a complete system.

DESCRIPTION OF THE PREFERRED EMBODIMENT

Figure 1:
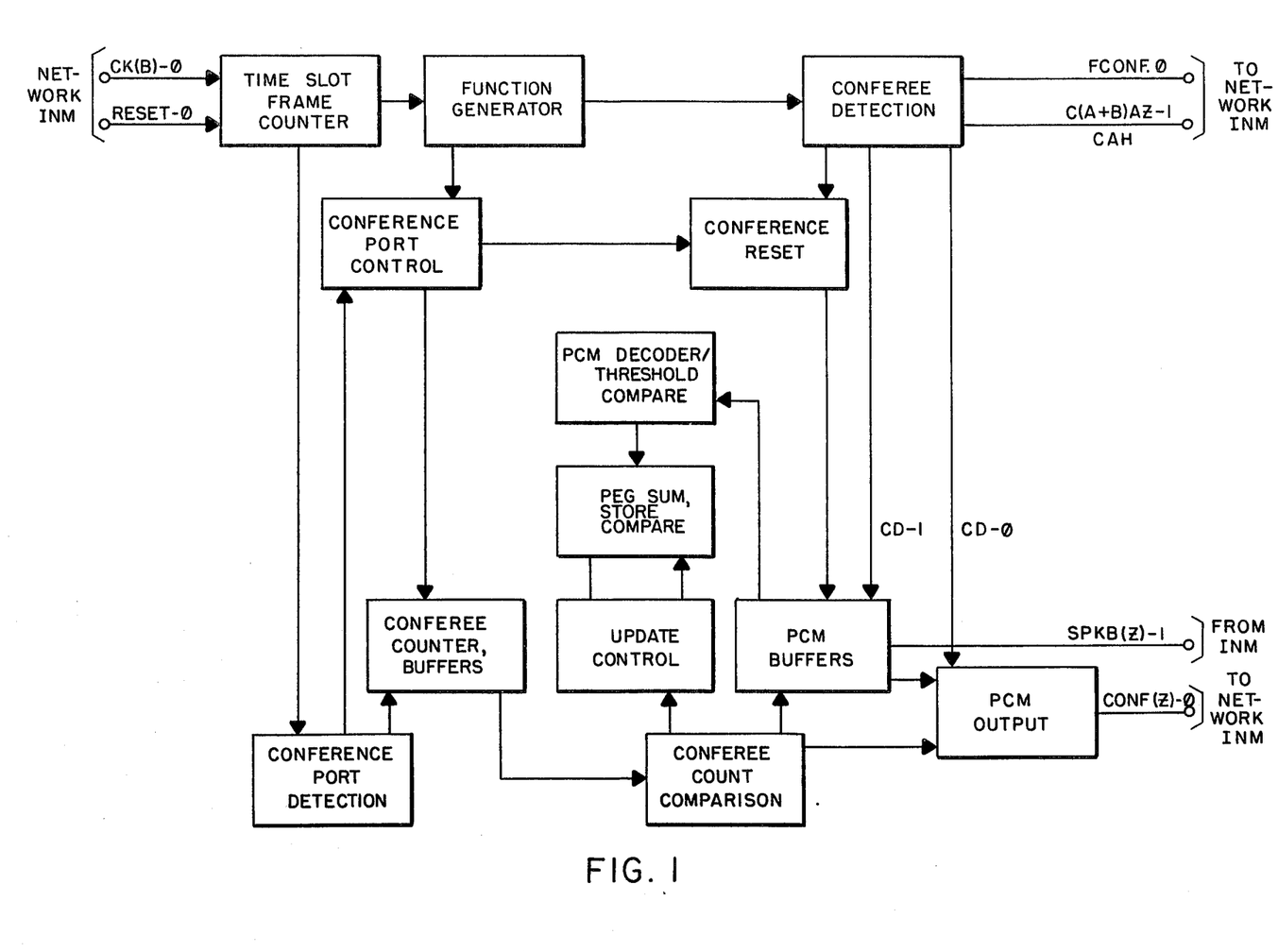
FIG. 1 is a functional block diagram of a conference circuit in accordance with the invention.
Figure 2:
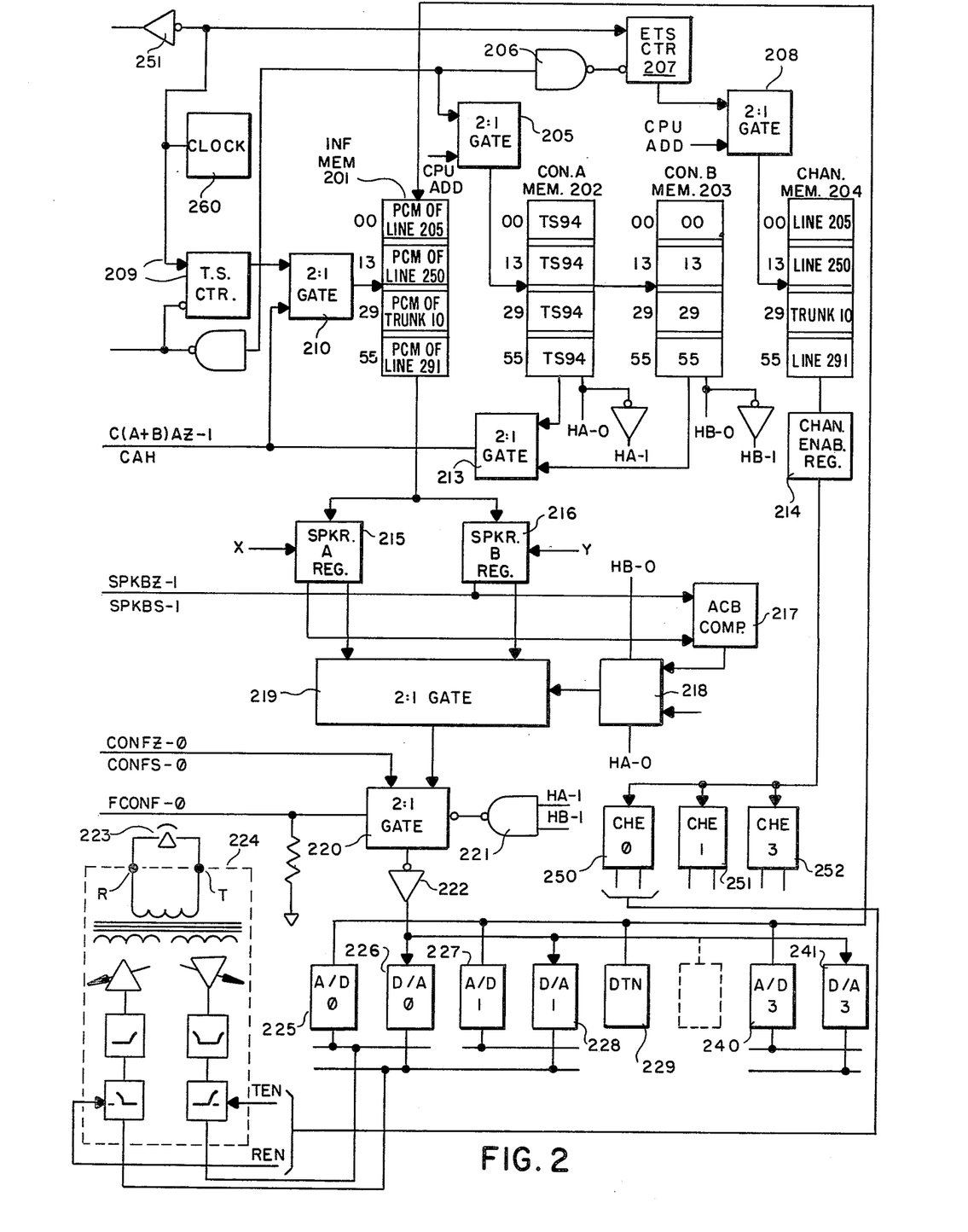
FIG. 2 is a schematic block diagram of a switching network with which the conference circuit is used.

The conference circuit of this invention consists of a group of functional sub circuits. These are shown functionally connected on FIG. 1 and also to the PCM switching system of FIG. 2 with which they function. These sub circuits are also shown in greater detail on FIGS. 3 through 8. These circuits are made up of medium scale integrated (MSI) circuit chips of the 7400 family of commercially available semiconductors, for example of the type shown in "The Integrated Circuits Catalog for Design Engineers" First Edition by Texas Instruments Incorporated.

Figure 3:
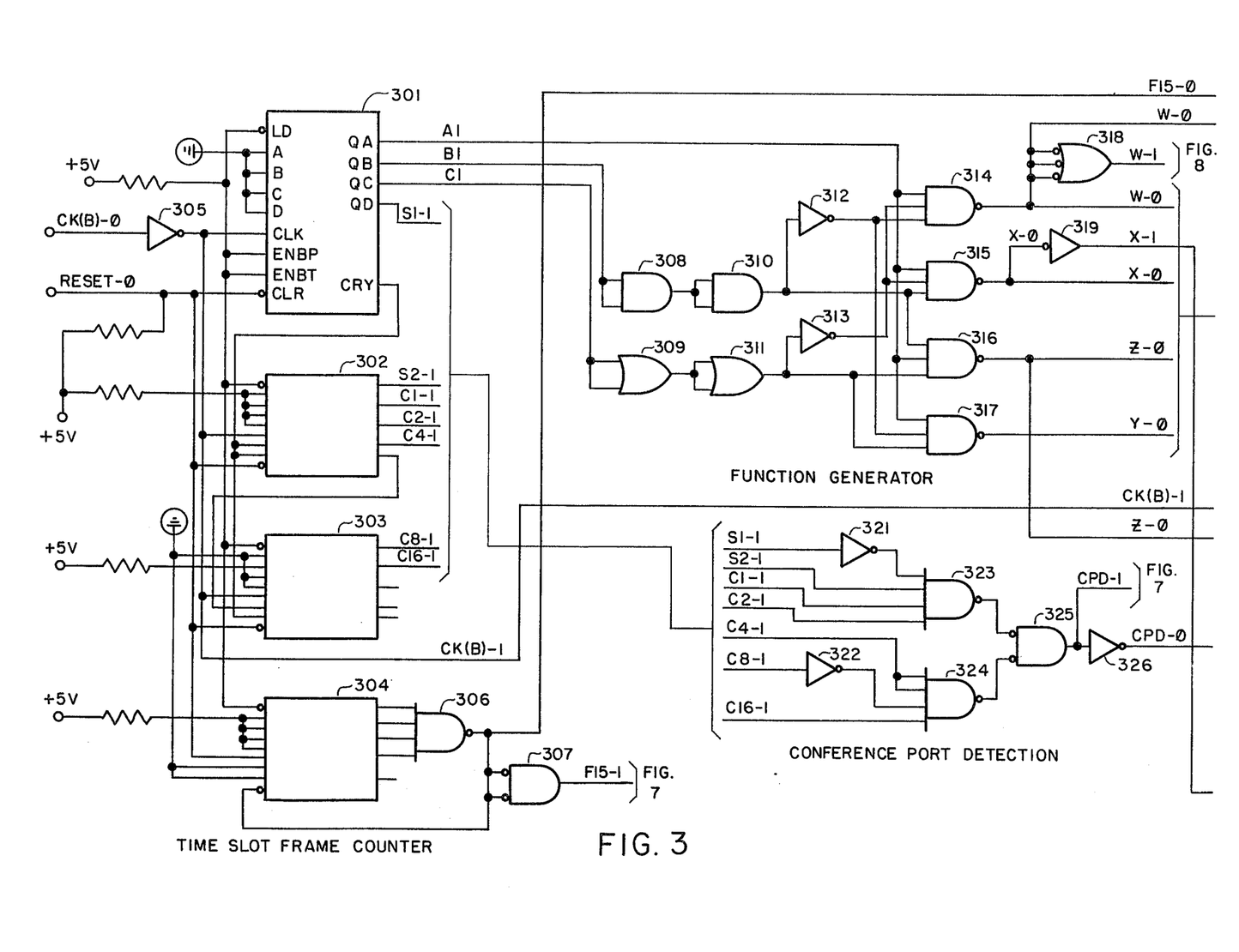
FIGS. 3 through 8 when arranged as shown on FIG. 9 comprise a schematic circuit of the conference circuit of this invention.
Figure 10:
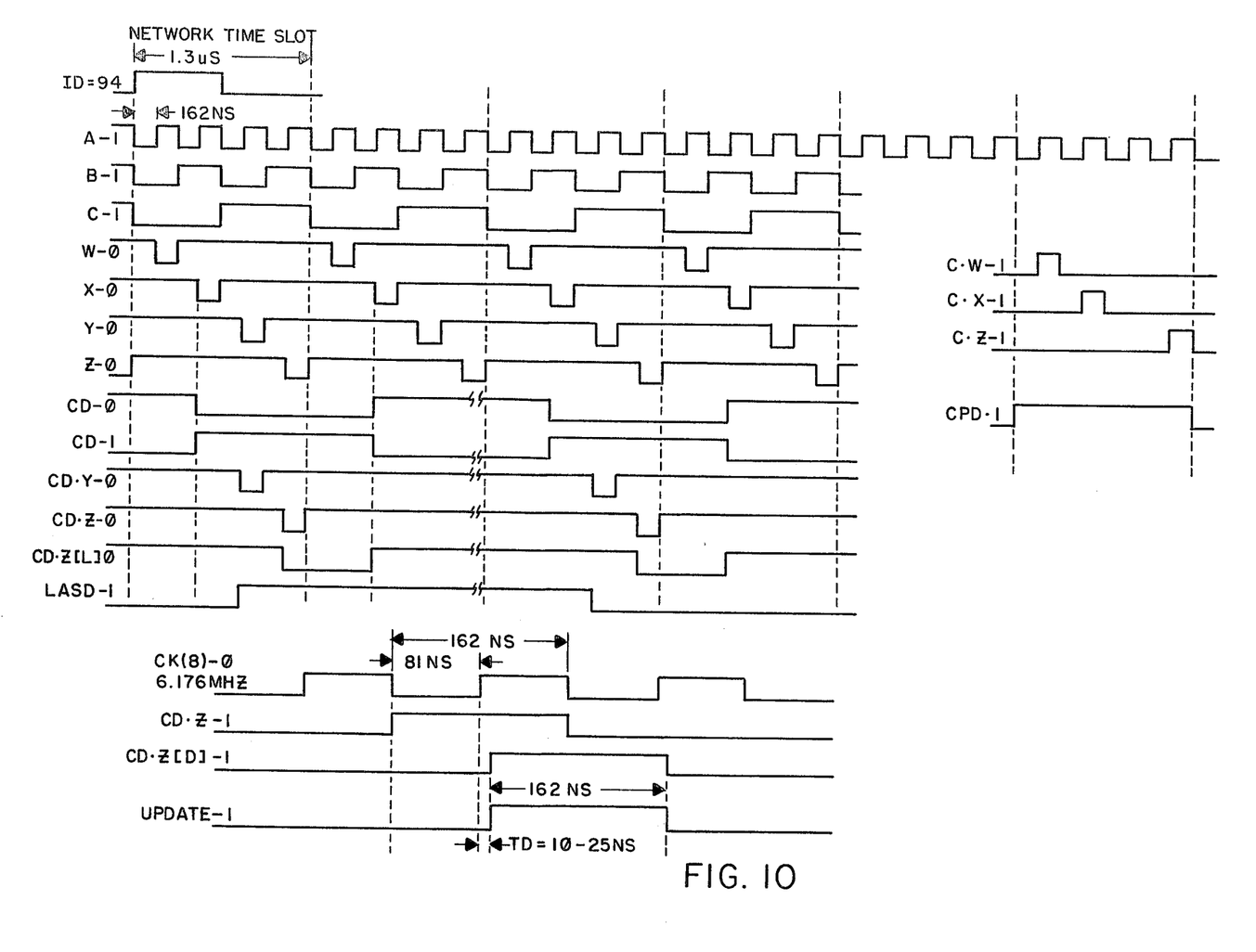
FIG. 10 is a pulse chart showing various ones of the system's pulses.

Slave Time Slot And Frame Counter (FIG. 3). This circuit operates in response to a clock signal CK(B)-$\phi$, shown on FIG. 10, from the network information memory 201. It basically utilizes 4 bit fully synchronous binary counters 301, 302, 303 such as for example the type SN-74163. At the end of a frame the counters are reset by the RESET-$\phi$ signal. This action forces synchronization of the slave counter to the timing of the information memory 201. The RESET-$\phi$ signal is also used to clock counter 304 at the end of each frame. Signal F15-1 is generated by gates 306 and 307 and is used to identify the end of the 15 frame selection set.

Function Generator (FIG. 3). The outputs A-1, B-1, and C-1 from counter 301 are fed to this circuit to create timing signals W$\phi$, X-$\phi$, Y-$\phi$, and Z-$\phi$. See FIG. 10. These occur during every time slot. These signals and their inverted true pulses are used for the conference control functions. The Logic Equations are as follows:

$$W = A1\overline{B1C1}$$

$$X = A1B1\overline{C1}$$

$$Y = A1\overline{B1}C1$$

$$Z = ABC.$$

Conference Port Detection (FIG. 3). When the time slot counter reads the conference port time slot (94), signal CPD-1 is generated by NOR gate 325 to indicate that the conference port is detected. This signal is used to enable the conference port control logic. The Equation for CPD is $$CPD = \overline{S1}.S2.C1.C2.C4.\overline{C8}.C16.$$

Figure 4:
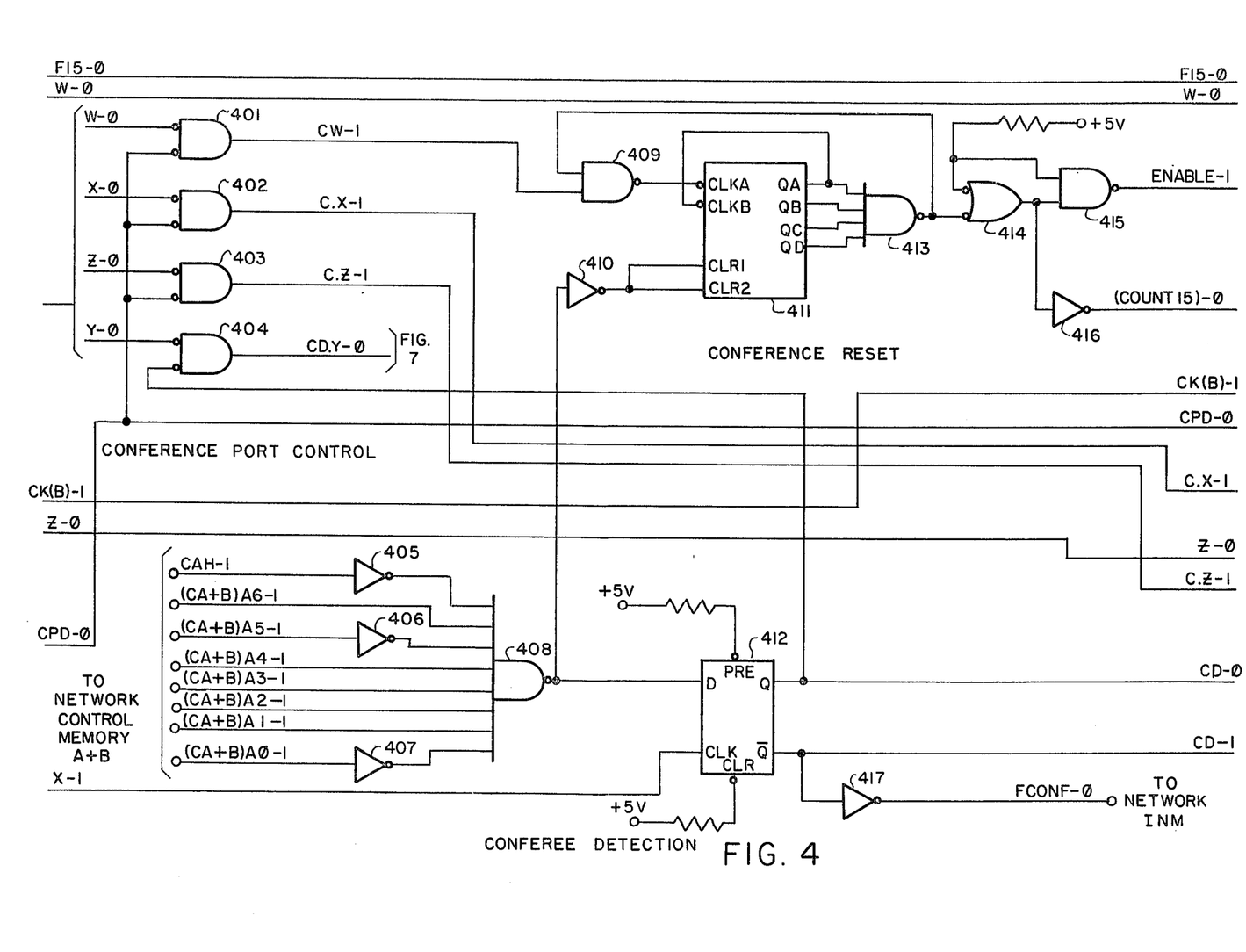

Conference Port Control (FIG. 4). During time slot 94, signal CPD-$\phi$ from driver 326 allows NOR gates 401, 402 and 403 to generate signals CW-1, C.X-1, and C.Z-1 respectively. Signal C.W-1 is used to advance the conference reset counter 411, via NAND gate 409. This counter resets and initiates the selection procedure.

Figure 7:
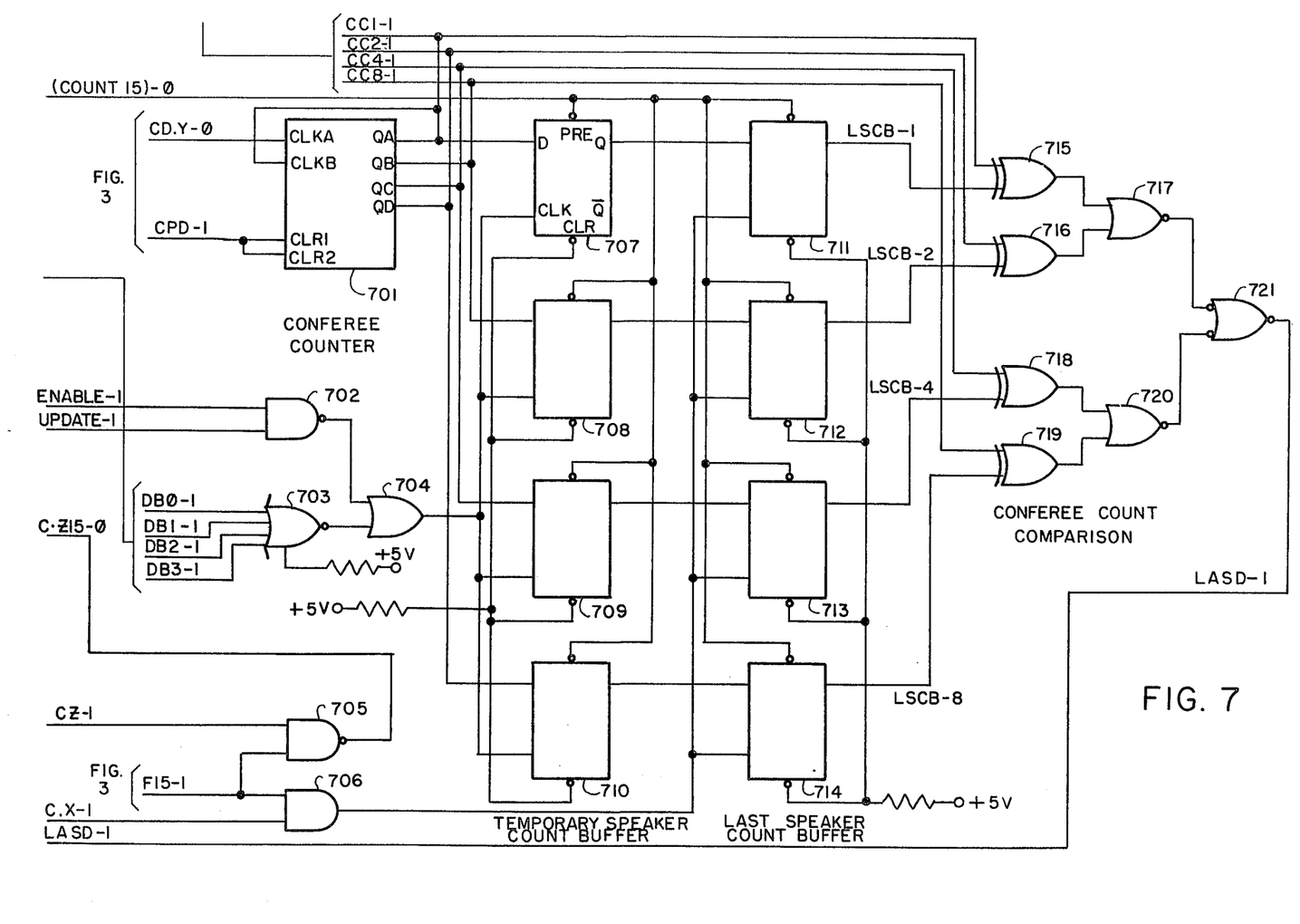
Figure 8:
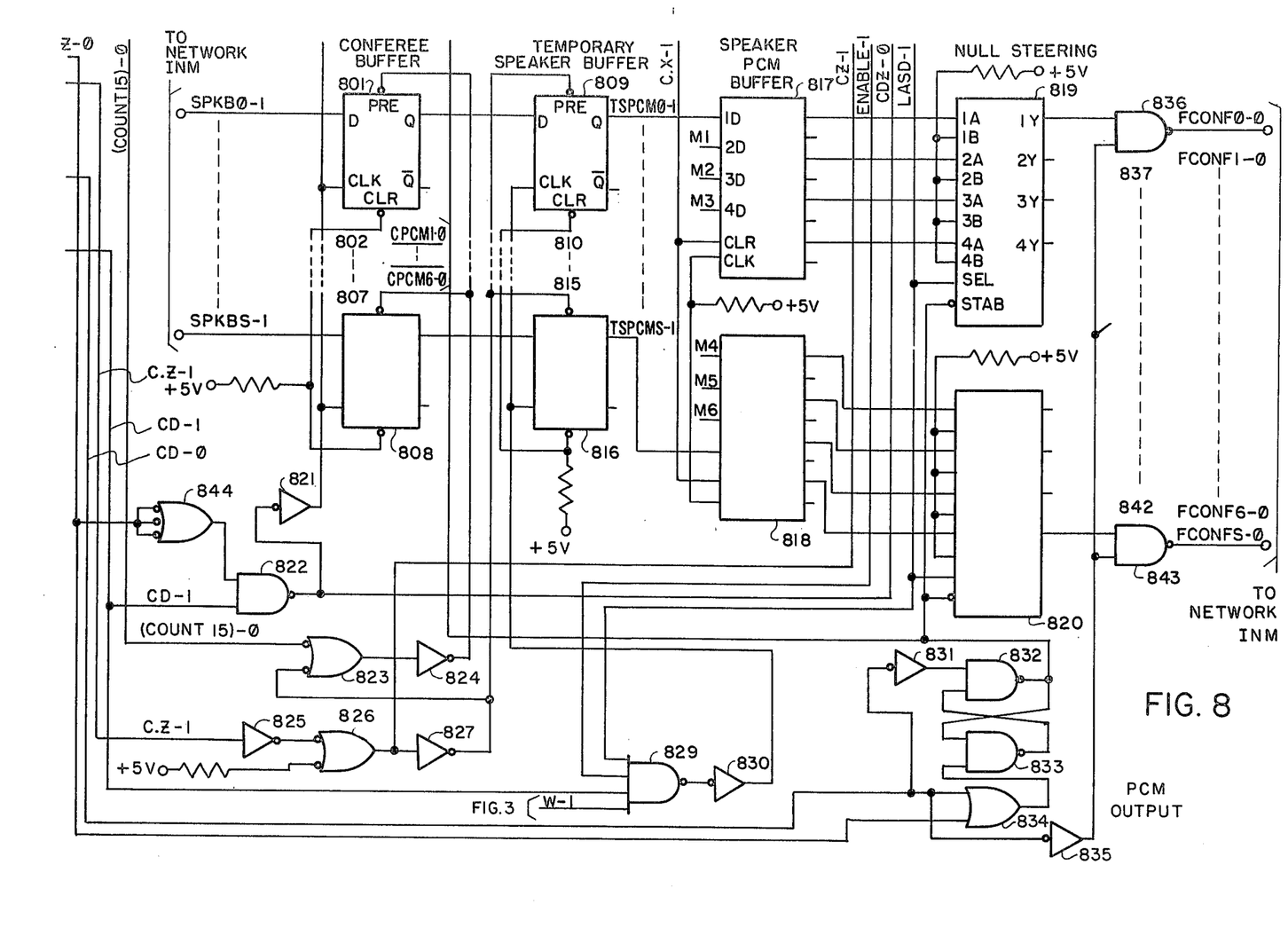
Figure 9:
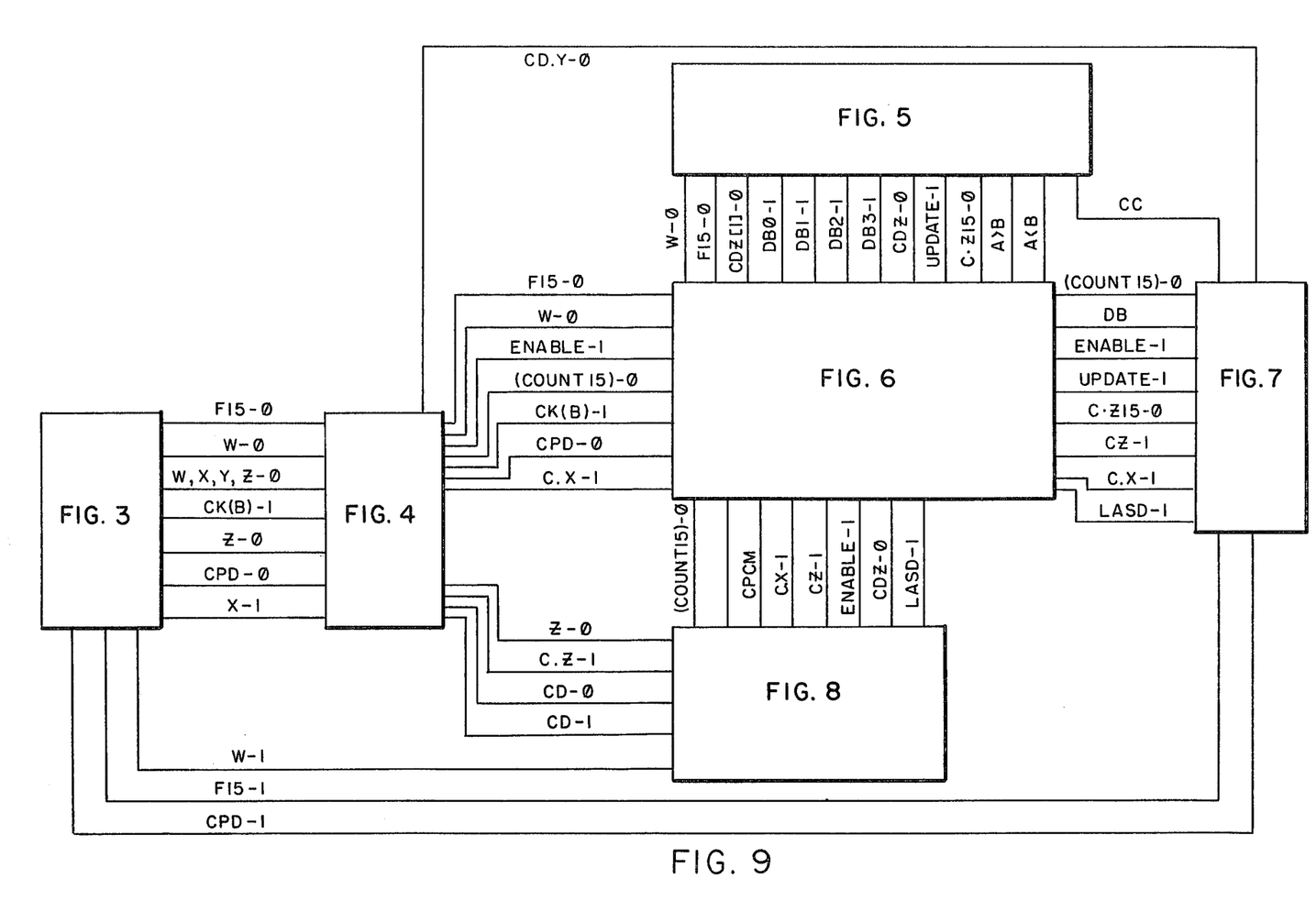

Signal C.X-1 is used for outputting the selected conferee's PCM code to the network. It effects the transfer of the Temporary PCM Buffers 809 to 816 contents to the Speaker PCM Buffer 817 and 818 at time slot 94 of each frame. During TS-94 of frame 15 of the 15 frame selection set signal C.X-1 is combined with signal F15-1 at gate 706 to transfer the newly selected conferee identity from Temporary Speaker Counter Buffers 707 to 710 to the last Speaker Counter Buffers 711 to 714. Signal C.Z-1 is used to preset the Conferee Buffers 801 to 808 via gates 823, 824, 825, 826 and 827, and to preset the Temporary Speaker Buffers 809 to 816 via gates 825, 826 and 827.

Conferee Detection and Control (FIG. 4). Conference participants are assigned a binary identity 94 (1011110) in the Control Memory A of the switching system. Gates 405, 406, 407, and 408 decode this condition along with the absence of the hold bit, CAH-1. When ID-94 appears, gate 410 resets the conference reset counter 411. The conferee detected flip-flop 412 is set by the signal X-1 from the function generator and its outputs then control the conference functions for that time slot. These functions include gating out the speaker's PCM code at gates 836 to 843, allowing the update control at gate 611, enabling the peg sum memory 503, 504 and enabling the PCM Decoder 601. Signal CD-1 is combined with signal Z-1 at gate 822 to load the conferee buffer, it is combined with signal Y-$\phi$ at gate 404 to advance the conferee counter 701, and is combined with signal Z-$\phi$ to set the latch consisting of gates 832 and 833, which gates the speakers PCM code or Null Code to the network via steering gates 819 and 820. The latch is reset by gate 831 when the signal CD-$\phi$ is removed due to Flip-Flop 412 being reset on some following time slot Z-1 pulse when ID-94 is not present. The Equation for CD is $$CD = CA6.\overline{CA5}.CA4.CA3.CA2.CA1.\overline{Ca\phi}.\overline{CAH}$$
$$(ID = TS94).$$

Conference Reset (FIG. 4). This circuit initializes the conference circuit by sensing the absence of any conferee for 15 frames. Thus the presence of signal CD-$\phi$ resets this 15 frame counter 411. Signal C.W-1 along with the absence of a decode of count 15 at NAND gate 413 advances the counter. Once count 15 is decoded, the counter is stopped and NAND gate 414 begins the initialization. The conference is idle and the various functions are inhibited by the output of NAND gate 415. The Temporary Speaker Count Buffer preset and Temporary Speaker Buffer loading functions are also disabled.

Conferee Counter (FIG. 7). The conferee Counter 701 is operated by signal CD.Y-$\phi$ from the Conference Port Control which indicates a conferee has been detected. The counter is reset by signal CPD-1 from the Conference Port detection circuit, which occurs every frame during TS94. The counter then indicates the assigned conference cycle position of the conferee. The counter count will correspond to the PCM code stored in the Conferee PCM Buffer. If this PCM code is transferred to the Temporary Speaker Buffer, the counter count will also be stored in the Temporary Speaker Counter Buffer, retaining the identity.

Conferee Count Comparisons (FIG. 7). The contents of the Conferee Counter 701 and that of the Last Speaker Count Buffers 711 to 714 are compared to aid in the decision to update a conferee to the temporary speaker status. The last speaker can be detected by comparing the Conferee Counter to the Last Speaker Count Buffer, and is indicated by signal LASD-1 from gate 721. Signal LASD-1 is used to force the update of the Temporary Speaker Buffers 809 to 816 via gates 829 and 830, to aid in the temporary update decision of the temporary sum buffer 507 and 508, via the update control circuit consisting of NOR gates 608 and 609 and AND gates 610 and 611. The Equation for LASD-1 is $$LASD = CC1 \oplus SC1.CC2 \oplus SC2.CC4 \oplus SC4.CC8 \oplus SC8.$$

Figure 6:
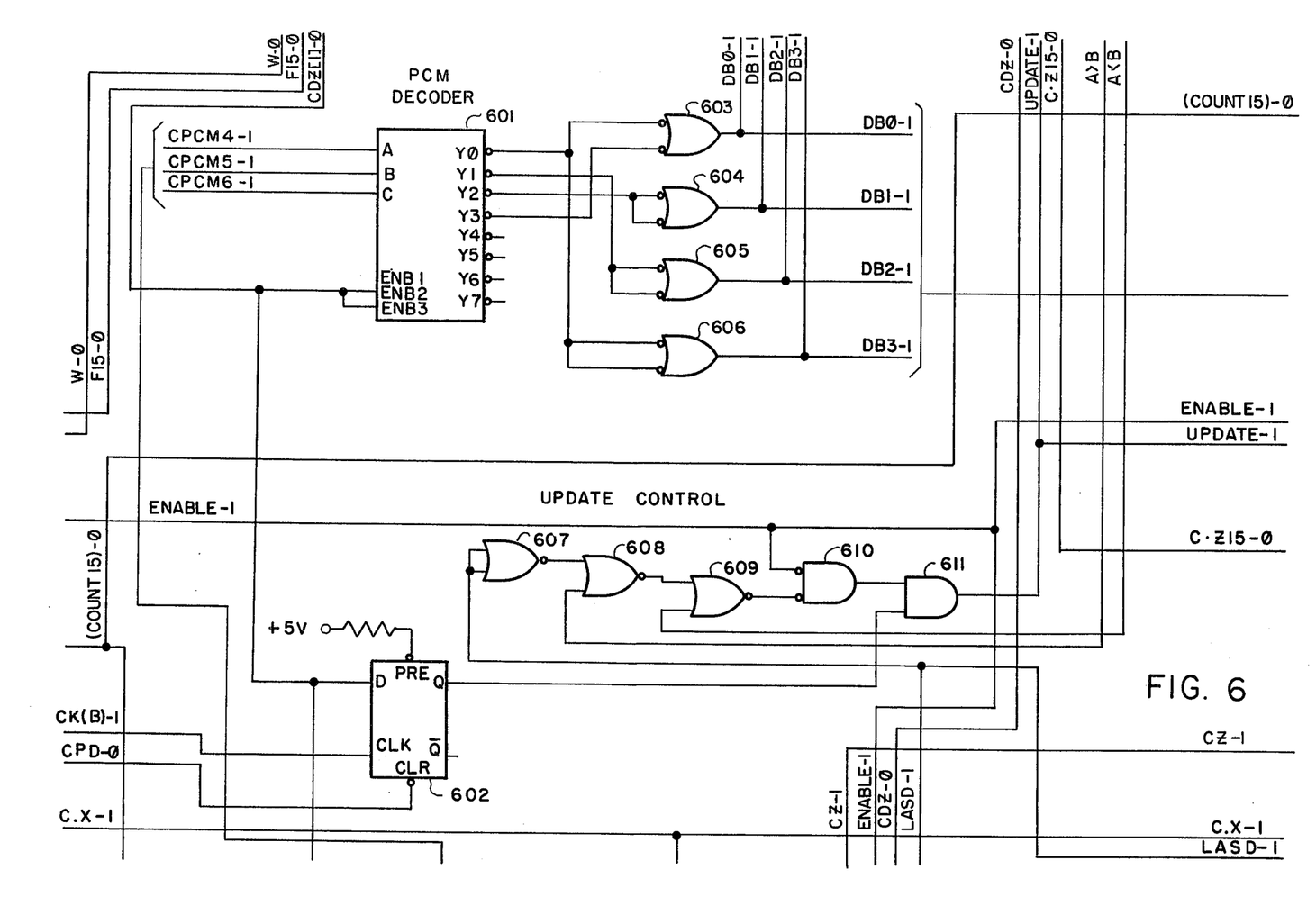

Threshold Comparison/PCM Decoder (FIG. 6). The three most significant bits on leads CPCM4-1, CPCM5-1 and CPCM6-1, of the PCM sample taken from the output of the Conferee Buffers 801 through 807 are decoded by a MSI circuit 601 and AND gates 603 to 606 and assigned a peg value depending on the PCM's relationship to the threshold. Signals DB$\phi$-1, DB1-1, DB2-1 and DB3-1 (DB$\phi$-1 is the least significant bit, DB3-3 is the most significant bit) of the assigned binary peg value are then available for the peg value comparison. The peg values are assigned according to the following table:

| Conferee PCM | | | Peg Value | | | | |
|---|---|---|---|---|---|---|---|
| CPCM6 | CPCM5 | CPCM4 | DB3 | DB2 | DB1 | DB0 | |
| 0 | 0 | 0 | 1 | 0 | 0 | 1 | 9 Pegs |
| 0 | 0 | 1 | 0 | 1 | 0 | 0 | 4 Pegs |
| 0 | 1 | 0 | 0 | 0 | 1 | 0 | 2 Pegs |
| 0 | 1 | 1 | 0 | 0 | 0 | 1 | 1 Peg |
| 1 | 0 | 0 | 0 | 0 | 0 | 0 | 0 Pegs |
| 1 | 0 | 1 | 0 | 0 | 0 | 0 | 0 Pegs |
| 1 | 1 | 0 | 0 | 0 | 0 | 0 | 0 Pegs |
| 1 | 1 | 1 | 0 | 0 | 0 | 0 | 0 Pegs |
| 0 | 1 | 1 | THRESHOLD | | | | |

Figure 5:
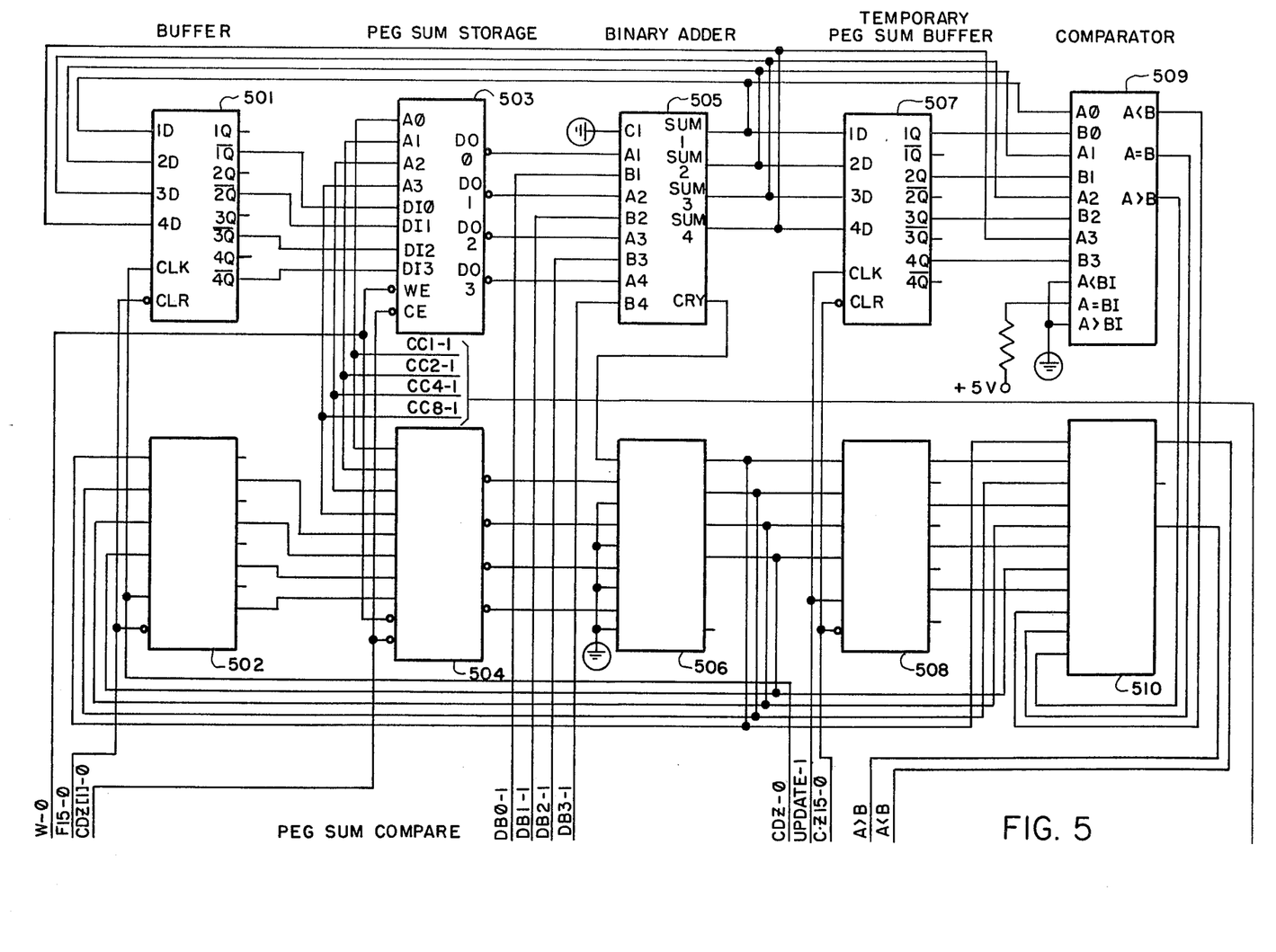

Peg Summing and Comparison (FIG. 5). Each party in the conference is given a location in Peg Sum Storage 503 and 504, where the peg sum is accumulated during the selection set. Peg Sum Storage is addressed by signals CC1-1, CC2-1, CC4-1, and CC8-1 from the Conferee Counter 701 so the conferees memory location corresponds with the identity. With each conferee identity the previous peg accumulation at that address is added to the conferees latest peg value, indicated by DB$\phi$-1, DB1-1, DB2-1, and DB3-1, via adders 505 and 506. This new peg sum is compared to the peg sum of the highest value previously determined as stored in the Temporary Peg Sum Buffer. The Peg Sum Buffers 507 and 508 will hold the peg sum of the last speaker, unless a conferee has exceeded the last speaker during the current selection set. The new conferee peg sum is compared to the Temporary Peg Sum by comparators 509 and 510, and if larger, then signal UPDATE-1 is generated via 608, and 609, 610 and 611 which loads the new conferee peg sum into the Temporary Peg Sum Buffer. Whether the conferee Peg Sum is larger than the Temporary Peg Sum Buffer or not the new conferee peg sum is loaded into buffers 501 and 502 during the presence of signal Z-$\phi$. Then, with the presence of W-$\phi$ the new conferee peg sum is loaded into its corresponding memory location, and replaces its previous value. The process is repeated for the next conferee identity. During the last frame of the selection set F15-$\phi$ clears buffers 501 and 502 to begin a new series of peg sum accumulations for the following selection set.

Update Control (FIG. 6). Signal UPDATE-1 from AND gate 611 may be generated several times during each frame to update the Temporary Sum Buffers (507 and 508). However, only during the last frame of the selection set is the Temporary Speaker Count Buffer 707–710 updated. The identity ending up in Temporary Speaker Count Buffer at the end of frame 15 is the identity to have control over the next 15 frames. A new Temporary Speaker is selected only after every 15 frames. The Equation for this signal is Update=A>B+LASD+A<B.EN.(CD.Z).

PCM Buffers (FIG. 8). The Conferee Buffers (801 to 808) are loaded by the signal CD.Z and contain the true PCM code from the network. The buffer is preset to all ones (least PAM) on either signal CZ or count 15. The Temporary Speaker Buffers 809 to 816 contain the code of the largest PCM for the selection set. During each frame of the selection set the selected conferee's PCM code will be transferred to the Speaker PCM Buffers 817 and 818 on signal CX-1.

PCM Output (FIG. 8). Steering gates 819 and 820 gate out the speaker PCM Buffer whenever CD.Z (L)-$\phi$ occurs without LASD-1. When LASD-1 occurs a Null code (all ones) is gated. Gates 836 to 843 gate this output to the network and signal FCONF-$\phi$ (417) allows this PCM to be sent via the network conference steering to the conferee.

Example of Connections Illustrating Features

The presently disclosed configuration allows for up to 10 conferees to be included in a conference. However, for the purpose of understanding the concepts, a simplified conference group of only 4 conferees will be described. Connections for more conferees would be achieved in the same manner as described for the 4.

In will be assumed that the conferees respective lines or trunks have been assigned the following time slot locations in the exchange switching system:

| Conf. | Line or Trunk | Assigned Time Slot | Equipment No. | Memory Address Data | | |
|---|---|---|---|---|---|---|
| | | | | CHE | A | B |
| A | 205 | 0 | 0D | 7C00-0D | 7D00-5E | 7D80-00 |
| B | 250 | 13 | 3A | 7C0D-3A | 7D0D-5E | 7D8D-0D |
| C | 10 (Trunk) | 29 | 89 | 7C1D-89 | 7D1D-5E | 7D9D-1D |
| D | 291 | 55 | 63 | 7C37-53 | 7D37-5E | 7DB7-37 |

The Channel Memory 204 has the transmit address and indicates the equipment number of the conferee to be transmitted to. The CON.A memory 202 contains the Data 5E (94 Decimal), indicating a participant in the conference, while the CON.B Memory 203 contains the conferee's own time slot identification.

Frame $\phi$ Time Slot 0: The presence of Channel A Memory data 5EH at the input to drivers 405, 406 and 407 and gate 408 produces at its output a logic 0 level signal ID-94-0, indicating the presence of a conferee in this time slot. Signal ID-94-0 with timing signal X-1 from the Function Generator NAND gate 315 and driver 319 set the conferee detection flip-flop 412. Signal CD-$\phi$ from flip-flop 412 combines with timing signal Y-$\phi$ from NAND gate 317 to clock the Conferee Counter 701. The outputs of flip-flop 412 are address lines CC8-1, CC4-1, and CC2-1, and CC1-1 and will now be logic levels 0, 0, 0, 1 respectively, indicating to the Temporary Speaker Count Buffers 707–710, that the first conferee is present. Signal CD-1, also from flip-flop 412, is combined with timing signal Z-1 via NAND gate 822 to clock the conferee's PCM sample into the Conferee Buffers 801–808. The outputs of buffers 805, 806, and 807 are respectively the three most significant bits of the PCM sample, excluding the sign bit. These signals, CPCM4-1, CPCM5-1, and CPCM6-1, are decoded via PCM Decoder 601 and NOR gates 603–606 to form a weighted binary code. The detector is in this example wired to decode the 3 PCM bits to a binary code of $\phi$, 1, 2, 4, or 9 ($\phi\phi\phi\phi$, $\phi\phi\phi1$, $\phi\phi1\phi$, $\phi1\phi\phi$, $1\phi\phi1$), depending on the PCM's relationship to a fixed threshold level. Decoded bits DB3-1, DB2-1, DB1-1, DB0-1 are the weighted outputs and are determined by the following PCM values:

| Decoder Inputs CPCM- | | | | Decoder Outputs DB- | | | |
|---|---|---|---|---|---|---|---|
| -6 | -5 | -4 | -3 | -2 | -1 | -0 | |
| 0 | 0 | 0 | 1 | 0 | 0 | 1 | |
| 0 | 0 | 1 | 0 | 1 | 0 | 0 | |
| 0 | 1 | 0 | 0 | 0 | 1 | 0 | |
| 0 | 0 | 0 | 0 | 0 | 0 | 1 | |
| 1 | 0 | 0 | 0 | 0 | 0 | 0 | (0) |
| 1 | 0 | 1 | 0 | 0 | 0 | 0 | (0) |
| 1 | 1 | 0 | 0 | 0 | 0 | 0 | (0) |
| 1 | 1 | 1 | 0 | 0 | 0 | 0 | (0) |

The weighted binary code is then added to that conferee's previous peg sum as stored in RAM memory sections 503 and 504, as selected by bits CC8-1, CC4-1, CC2-1, and CC1-1 from the conferee counter 701 indicating the conferee's position in the conference group. However, since this is the first frame, that data would be $00_H$. Previous to the beginning of the conference the signal F15-0 would have cleared any data in buffers 501 and 502, then clearing that memory location in the RAM 503 and 504 at the same time that the new PCM data was being loaded into the Conferee Buffers 801–808. The data is added via binary adders 505 and 506. The new peg sum is then compared to the data in the Temporary Peg Sum Buffers 507 and 508, via comparators 509 and 510. At this point the data in buffers 507 and 508 would be $00_H$, as they would have been cleared by F15-1 and timing signal CZ-1 via NAND gate 705 previous to the beginning of the conference. At this point if the conferees peg sum total (from 505, 506) is less than or equal to the data in temporary peg sum buffers 507 and 508, no update occurs, and the conferee's new peg total is loaded into his RAM location. However, if the new peg value generated from comparator 509 and 510 which generate the signal UPDATE-1 via update control gates 607–611 is smaller, it will load the new peg sum total into the temporary peg sum buffers 507 and 508.

This data now becomes the basis for future conferee peg sum comparison. Also, when UPDATE-1 is generated, that conferee's identity is loaded into temporary speaker count buffers 707-710, so that it is saved.

Time Slots 13, 29 and 55: During a time slot where no conferee is present, signal ID-94-0 is at a logic high level so that signals CD-0 and CD-1 from flip-flops 412 are at the opposite levels needed for enabling the selection circuitry. During time slots 13, 29, and 55, where conferees are present the circuit performs as in time slot 0. The difference is that each time a conferee is detected the conferee counter 701 is incremented by 1 to provide that conferee's identity to the Temporary Speaker Count buffers and for his address in the RAM. As with the first conferee (slot 0), signals CC8-1, CC4-1, CC2-1, and CC1-1 became 0, 0, 0, 1 respectively. The signal will become 0, 0, 1, 0 with conferee B (slot 13); 0, 0, 1, 1 with conferee C (slot 29); and 0, 1, 0, 0, with conferee D (slot 55). These signals distinguish which conferee is being considered at that time slot. During these time slots, as in time slot 0, the PCM is converted to a weighted binary code, added to his previous sum total from RAM (this should always be $00_H$ during the first frame), and compared to the code in the Temporary Peg Sum Buffers 507 and 508. Again, if the peg sum total at that time slot is less than or equal to the peg sum in the Temporary Peg Sum Buffers 507 and 508, no update occurs. If the new peg sum total is greater than the sum in the Temporary Peg Sum Buffers 507 and 508, then an update occurs placing the new peg sum in the buffers, and loading the conferee's identity into Temporary Speaker Count Buffers 707-710.

Time Slot 94: Time slot 94 is the time slot which is dedicated to conference selection, so there will never be a conferee present in that slot. Signal CPD-1 is generated by the Slave Time Slot Counter Figure 3 to indicate when Time Slot 94 is present. CPD-1 is also used for various timing functions. During frames 0-14, CPD-1 resets the Conferee Counter 701 to 0000, so that it is ready for the first conferee in the next frame.

Frames 1 through 14. The operation during frames 1 through 14 is the same as for frame 0. During each time slot where a conferee is detected, the PCM is decoded, added and compared. Updates continue so that at the end of frame 14 the peg sum of conferee with the largest total energy thus far is the Temporary Peg Sum Buffers 507, 508, and his identity is in the Temporary Speaker Buffers 809-816.

Frame 15. Frame 15 continues the comparison process as in frames 0-14 up to time slot 94. Time slot 94 of frame 15 is used for the final conferee selection operation. The identity of the conferee with the largest peg sum total, or greatest total energy, is in the Temporary Speaker Count Buffers 707-710. At this time the contents of the Temporary Speaker Count Buffers 707-710 will be transferred to the Last Speaker Count Buffers 711-714. For the next 16 frames (0-15) that conferee will have speaker control. The outputs of the Last Speaker Count Buffers (711-714) form the signal LASD-1 which indicates when the last speaker is detected. The signal LASD-1 performs three main functions. (These are performed during the next 14 frames of the next selection set.) First, signal LASD-1 is combined with signal CD-1 and timing signal W-1 via NAND gate 829 to clock the conferee's PCM code from the Temporary Speaker Buffers 809-816 to the Speaker PCM buffers 817 and 818. Secondly, when timing signal C.X-1 clocks the PCM from the Speaker PCM Buffers 817 and 818 to the Null Steering Logic 819, and 820, signal LASD-1 steers the logic to output a null code to the selected conferee. The Speaker's PCM code goes to all conferees except the speaker himself, who is designated by LASD-1. The PCM is then outputted to the system when a conferee is indicated by signal CD-0. The final function of LASD-1 is to provide an update in case of a tie. Normally, when a conferee's peg sum total is compared to that in the Temporary Peg Sum Buffers 507 and 508, no update occurs if the peg sum is less than or equal to the contents of the buffers. However, if the conferee is the last speaker to have control, then an update will occur if the signals are equal.

What is claimed is:

1. In a pulse code modulated (PCM) communication system, a plurality of communication channels arranged on a multiplexed basis, a switching system including a memory, a memory access for said communication channels and a conference circuit arrangement including, a first register connected to said memory and operated to store the pulse code modulated value of information from each of said channels conducted sequentially through said memory, a voice level coding means connected to said first register responsive to said information to output a code value representative of the voice level of said information, above an established threshold level, a second register connected to said first register and including an output circuit, a conferee sum storage means including an output circuit, binary adder means having a first input means connected to said coding means and a second input means connected to said first and said second inputs to provide an output, a third register connected to receive said output of said binary adder means and including an output circiut, a first comparator circuit connected to said binary adder means and to said third register output circuit and operated to compare said outputs and in response to a determination that the value of information stored in said binary adder means is less than the value of information stored in said third register to provide a first output signal, said third register operated in response to said first comparator circuit first output signal to store said binary adder means output, first counting means connected to said memory and periodically incremented in reponse to signals from said memory, a fourth register connected to said counting means and arranged to store the count of said counting means, a fifth register connected to said fourth register, a second comparator circuit connected to said counting means and fifth register(s) and operated in response to a determination that the count stored in said counting means and fifth register(s) are equal to provide an output signal, a second counting means connected to said memory and operated to count the number of sequences of said memory to provide an output signal upon the passage of a predetermined number of sequences, and means responsive to said second counting means output signal to operate said fifth register to accept the count stored in said fourth register, a sixth register connected to the output of said second register and having an output to said switching system and operated in response to said signal from said second counting means for transfer of said pulse code modulated value of information from said second register to said channels under control of said switching system, and gating control means connected to said first and second comparator circuits and selectively operated in response thereto to provide an update signal, said update signal coupled to said conferee sum storage means to operate it to accept the pulse code modulated value of information from said binary adder means for storage therein, said update signal further being coupled to said fourth register to operate the latter to transfer the count in said counting means into storage in said fourth register.

2. An arrangement as claimed in claim 1, further including a blanking means connected between said sixth register output and said switching system and operated in response to said second comparator for detecting a coincidence of said counter output and said fifth register contents to block said sixth register output.

3. An arrangement as claimed in claim 1, further including a reset means connected to said memory access and operated to produce a reset signal upon detecting an absence of information to said conference circuit to reset all of said registers.

4. An arrangement as claimed in claim 2, further including a reset means connected to said memory access and operated to produce a reset signal upon detecting an absence of information to said conference circuit to reset all of the registers.

5. An arrangement as claimed in claim 1, further including transfer control means operated in response to said second comparator circuit output signal to enable said second register to accept said first register output.

6. An arrangement as claimed in claim 1, wherein said first comparator circuit is operated to provide a second output signal upon a determination that the value of information stored in said binary adder means is greater than the value of information stored in said third register, and further including second control means operated to transfer binary adder means output into said conferee sum storage means.

7. An arrangement as claimed in claim 1, wherein said conferee sum storage means is a memory circuit having a storage area for each conferee.

8. An arrangement as claimed in claim 7, wherein said storage areas are addressed by said first counting means.

* * * * *

UNITED STATES PATENT AND TRADEMARK OFFICE
CERTIFICATE OF CORRECTION

PATENT NO. : 4,274,155
DATED : June 16, 1981
INVENTOR(S) : Tim Funderburk and Donald W. McLaughlin It is certified that error appears in the above-identified patent and that said Letters Patent are hereby corrected as shown below:

Column 12, line 21, after "transfer" insert --said--.

Signed and Sealed this

Sixth Day of October 1981

[SEAL]

Attest:

GERALD J. MOSSINGHOFF

*Attesting Officer*     *Commissioner of Patents and Trademarks*